Sept. 14, 1965   W. H. JACOBS ET AL   3,206,069
APPARATUS AND METHOD FOR CARBONATING AND DISPENSING BEVERAGES
Filed Oct. 5, 1961   6 Sheets-Sheet 4
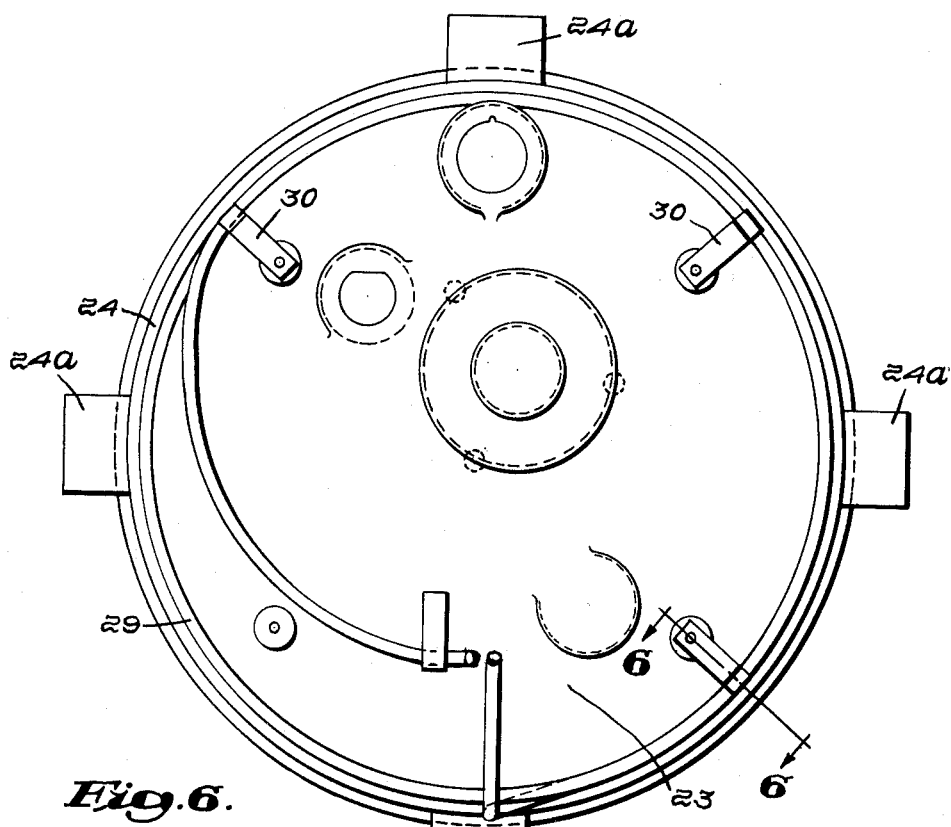
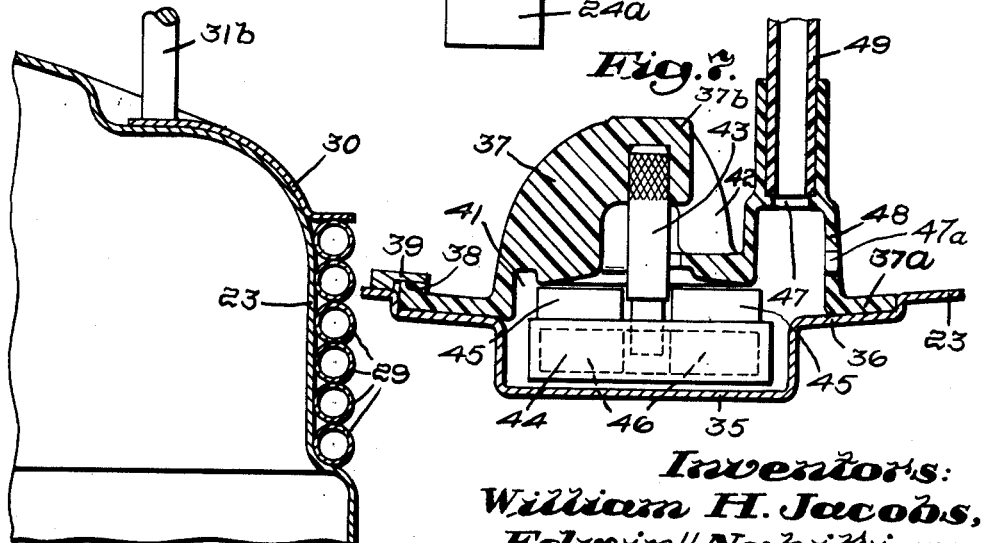
Inventors:
William H. Jacobs,
Edwin H. Nahikian,
Alfred Armstrong,
by Arthur D. Thomson Attorney

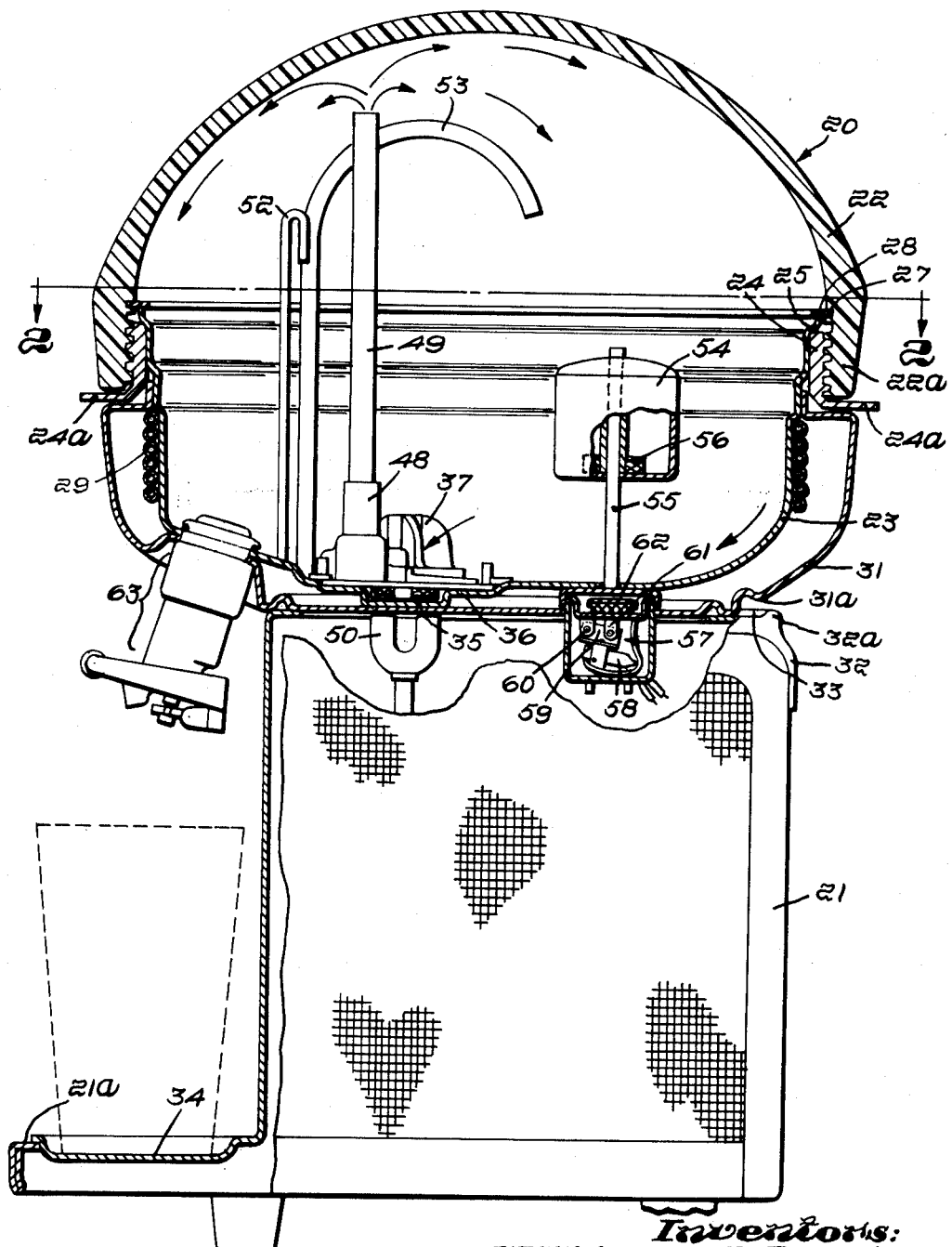

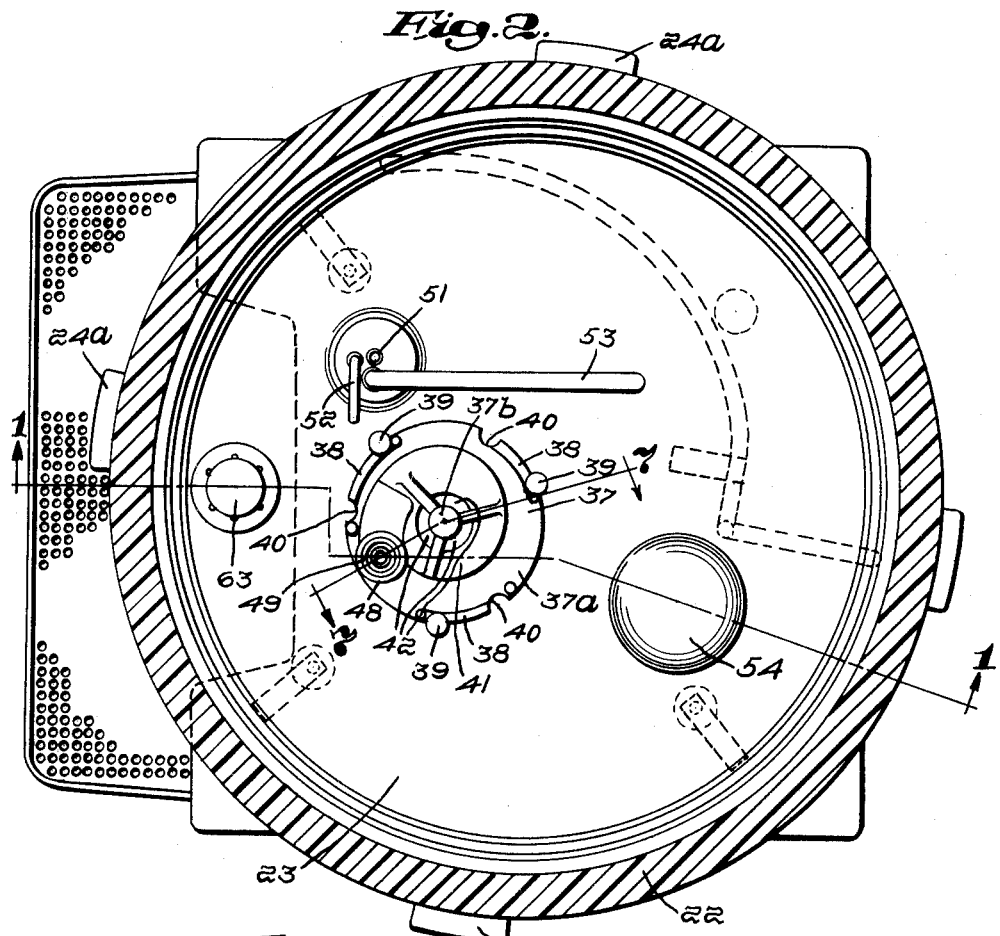
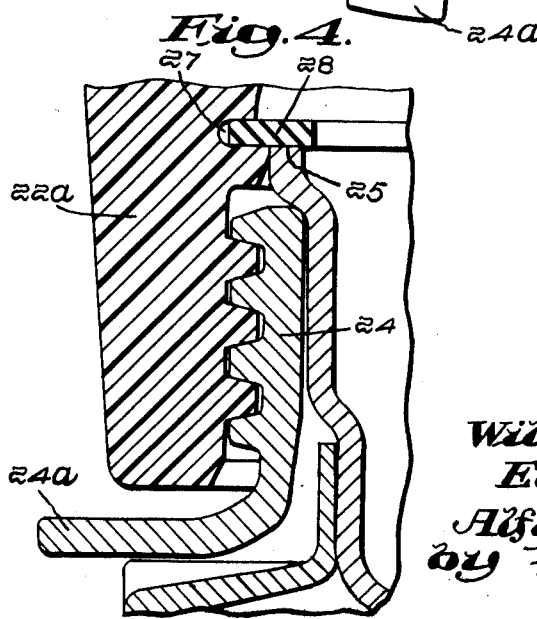

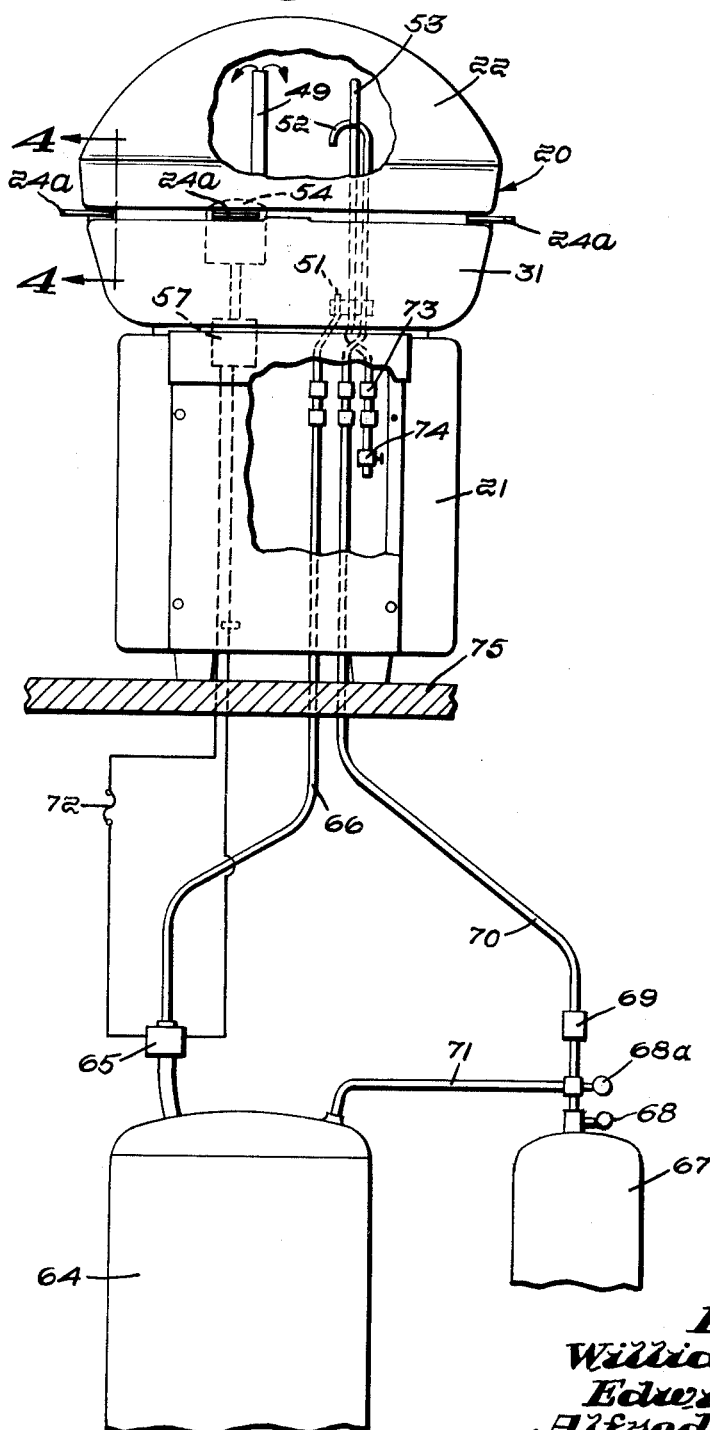

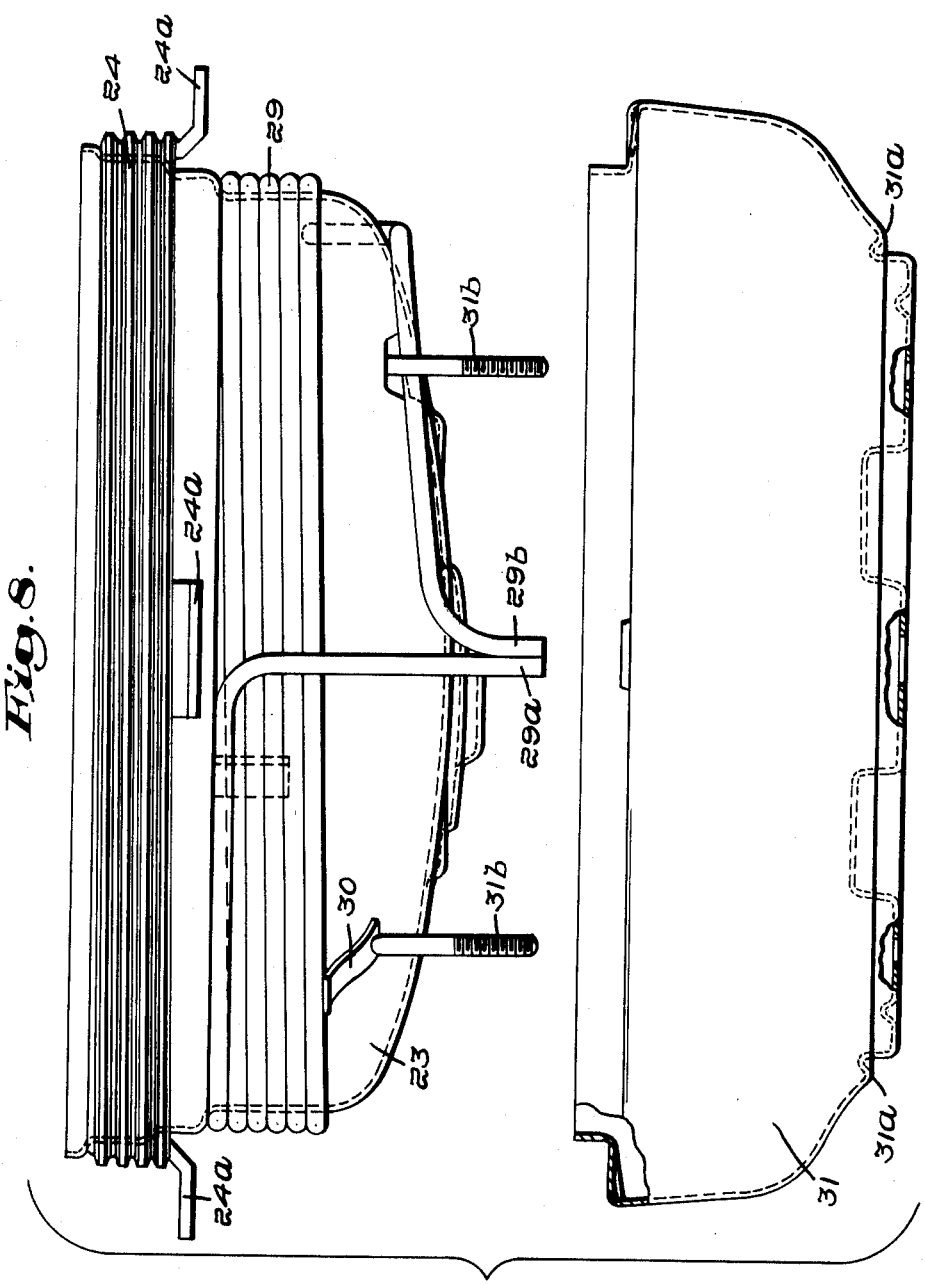

Sept. 14, 1965 W. H. JACOBS ET AL 3,206,069
APPARATUS AND METHOD FOR CARBONATING AND DISPENSING BEVERAGES
Filed Oct. 5, 1961 6 Sheets-Sheet 6
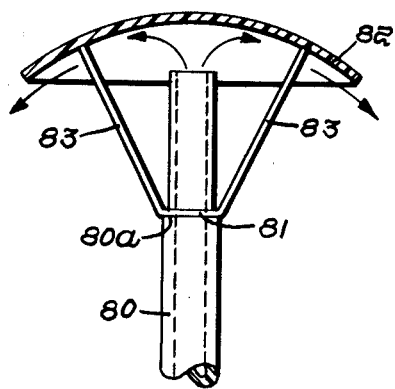
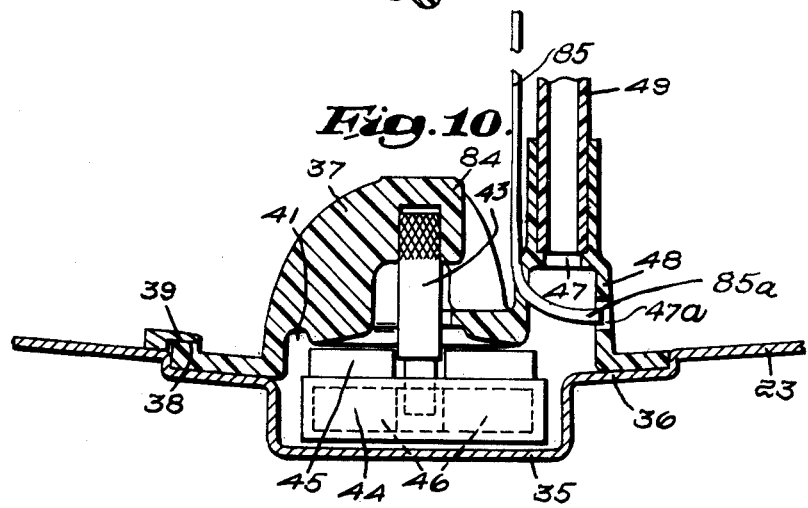
Inventors:
William H. Jacobs,
Edwin H. Nahikian,
Alfred Armstrong,
by Arthur D. Thomson Attorney United States Patent Office 3,206,069
Patented Sept. 14, 1965

3,206,069
APPARATUS AND METHOD FOR CARBONATING
AND DISPENSING BEVERAGES
William H. Jacobs, Brookline, Edwin Nahikian, Wayland, and Alfred Armstrong, Norwood, Mass., assignors to Product R & D, Incorporated, Waltham, Mass., a corporation of Massachusetts
Filed Oct. 5, 1961, Ser. No. 146,063
3 Claims. (Cl. 222—1)

This invention relates to devices and methods for making and dispensing carbonated beverages, and more particularly to the type of apparatus used in soda fountains, restaurants, and similar establishments which serve carbonated beverages for immediate consumption.

One typical example of present carbonated beverage dispensers consists essentially of a discharge nozzle mounted on a counter or stand connected through piping to a replaceable storage container filled with pre-mixed carbonated beverage. The beverage runs through a cold plate or refrigerating unit as it passes to the nozzle. A pressurized cylinder of carbon dioxide is connected to the container but is used not for carbonating but merely as a source of pressure for discharging the beverage through the nozzle. These devices are adapted only for cooling and dispensing pre-mixed carbonated beverage purchased from a commercial carbonating or bottling plant in sealed storage containers of suitable size.

Some soda fountains and similar establishments have their own carbonating equipment installed on the premises. These carbonators are smaller versions of the equipment used by beverage manufacturers and operate on the same principle, by spraying water into a pressure tank of carbon dioxide and withdrawing the carbonated liquid. Such carbonators are costly, fairly large and cumbersome, and operate at high pressure, for example 75 to 100 pounds per square inch, so that they fall in the class of pressure vessel equipment which is subject to special safety regulations in most localities. A high capacity pump is required for injecting the water into the carbonating tank or pressure vessel. For these reasons it is not feasible to mount such equipment at the point of sale. The carbonator is usually mounted in the basement or some other remote location, and connected by piping to dispensing nozzles on the service counter. The piping may pass through a cold plate or refrigerating element. Because of the difficulty of cleaning such an installation, this type of equipment is used, ordinarily, merely as a source of carbonated water. The beverage is mixed at the point of sale either in the glass or by means of a mixing nozzle which injects syrup into the water as it is dispensed into a glass.

Both the common types of carbonated beverage dispenser just described have certain limitations. For example, most people prefer carbonated beverages served at or near the melting temperature of ice. To achieve this temperature by means of the usual refrigerating element it would be necessary to run the refrigerating coil at a considerably lower temperature, about 0° F. This is not practicable, because the carbonated liquid is likely to freeze in the supply pipe. Ice is sometimes added to the drink in the glass, but this dilutes the beverage. Futhermore, these devices cannot maintain the optimum degree of carbonation for palatability, which is up to 4 or 5 volumes of carbonation.

An important object of this invention is to provide a combined carbonating and dispensing device which is sufficiently compact to be mounted in its entirely at the point of sale, for example on a lunch counter, which is capable of maintaining and dispensing carbonated beverage at the preferred drinking temperature, that is at or even somewhat below 32°, which may be readily dismantled for cleaning and re-assembled by an unskilled attendant, which operates at pressures low enough for safe use in public locations, which is considerably less expensive to manufacture, install, and operate than the equipment heretofore available and yet produces a beverage of superior carbonation and flavor, and which is adaptable either for carbonating uncarbonated liquids, or for maintaining and refreshing a beverage supplied in carbonated form.

The new apparatus consists of a pressure vessel or carbonating tank which is kept partially filled with mixed beverage, a circulating pump mounted entirely within the vessel and driven through magnetic coupling by a motor outside the vessel, and means for maintaining a head of carbon dioxide in the vessel above the liquid. The tank is refrigerated, for example, by refrigerating coils surrounding its lower part. The pump continuously circulates liquid from the lower part of the tank up through a standpipe which discharges the liquid into the head of carbon dioxide. The liquid thus discharged becomes carbonated by passage through the gas and flows back to the lower part of the tank where it again enters the pump for re-circulation through the carbon dioxide head. The tank is provided with a built-in dispensing valve by which portions of the carbonated and refrigerated beverage may be withdrawn as desired.

As the entire liquid contents of the tank are continuously circulated, the refrigerating coils may be kept at a low enough temperature to chill the beverage to the freezing point of water or even a little below, for example around 30° F. The beverage when discharged is thus at the desired temperature for drinking.

As is well known, the maximum quantity of gas which can be entrained in a liquid varies according to the pressure and inversely with the temperature of the liquid. If the temperature of the liquid to be carbonated is lowered, the gas pressure required for a certain degree of carbonation is correspondingly reduced. Furthermore, by continuously re-circulating the liquid through the carbon dioxide head, instead of passing the liquid through the gas only once, as is customary in previous carbonators, the theoretical maximum carbonation for a given temperature and pressure will be closely approached. For both these reasons it is possible to obtain with the new apparatus operating at less than 30 pounds per square inch, a degree of carbonation higher than that obtained by the previously known common types of carbonators which operate at 75 to 100 pounds per square inch.

The carbonating tank is preferably connected to a source of mixed beverage, from which liquid is supplied from time to time to replenish the beverage withdrawn from the tank. Preferably the liquid supply is controlled by a suitable level control, such as a float-operated valve.

The tank in the specific example here shown is constructed in two parts, a lower bowl and an upper dome, connected together by a coupling ring which forms a pressure-tight joint. These parts can be readily dismantled by hand to expose the inside of the tank for cleaning. The pump is also constructed so that it can be readily removed for cleaning.

Other objects, advantages and novel features will be apparent from the following detailed description.

In the drawings illustrating the invention:
FIG. 1 is a vertical cross-section of a carbonating and dispensing device constructed according to the invention;
FIG. 2 is a cross-section taken along line 2—2 of FIG. 1;
FIG. 3 is a rear elevation of the device, parts of the casing and dome being shown cut away, with the liquid and carbon dioxide supply system shown schematically;
FIG. 4 is an enlarged fragmentary cross-section taken along line 4—4 of FIG. 3;

FIG. 5 is a bottom view of the lower bowl and refrigerating coil assembly;

FIG. 6 is an enlarged fragmentary cross-section taken along line 6—6 of FIG. 5;

FIG. 7 is an enlarged fragmentary cross-section taken in the region of the circulating pump;

FIG. 8 is an exploded view of the lower bowl and its jacket;

FIG. 9 is a fragmentary detail, partly in cross-section, taken in the region of the upper end of the standpipe and illustrating a modification; and FIG. 10 is a fragmentary cross-section illustrating a modified form of carbon dioxide distribution system.

The storage and carbonating tank, generally indicated by the numeral 20, is mounted on a stand, generally indicated by the numeral 21, which also houses a refrigerating unit (not shown) which may be of any suitable construction. The stand has a shelf 21a on which a cup (shown in dotted outline in FIG. 1) or other receptacle may be placed for filling.

The carbonating and storage tank is designed to operate as a pressure vessel, and consists of a dome 22 preferably made of transparent plastic, and a bowl 23, made of corrosion resistant non-magnetic material, such as stainless steel. The dome has an internally threaded lower rim 22a which is engaged by a threaded ring 24 rotatably surrounding the bowl and held captive by an overhanging lip 25 on the bowl. The dome has an internal groove 27 in which a compressible gasket 28, of rubber or similar material, is disposed. The gasket engages the upper surface of lip 25 to form a seal, when ring 24 has been turned in the proper direction to draw dome 22 downward. The ring has four tabs 24a projecting beyond the dome to provide hand grips.

The bowl 23 is surrounded by a refrigerating coil 29 having ends 29a and 29b extending downward into the stand and connected to a suitable refrigerating apparatus which circulates refrigerant through the coil and may be thermostatically controlled according to well known practice.

The coil is secured to the bowl by tabs 30. The bowl is surrounded by a jacket 31, preferably made of plastic, and is mounted on the stand by means of studs 31b extending through the jacket and secured to the stand in any suitable manner. The jacket which preferably contains thermal insulation (not shown) has a downwardly projecting lip 31a which tends to cause moisture condensing on the outside to collect and drip off at this point. The stand has a cover piece 32 with a upstanding lip 32a forming a trough 33 under lip 31a to catch drippings. The trough extends around the rear and sides of the jacket and slopes toward the front so that the collected moisture will run down to shelf 21a which is provided with a drip tray 34.

The bowl 23 has a cylindrical well 35 surrounded by a shallow ring-shaped depression 36. A circular cap 37, preferably made of molded plastic, is disposed over the well and has a flat rim portion 37a which is seated in depression 36. This rim portion carries sloping upstanding projections 38 which engage under tabs 39 attached to the bowl, to lock the cap in place. The cap has edge notches 40, and can be removed by turning to bring the notches into register with tabs 39. A volute-shaped inverted trough 41 is formed in the cap, and the cap has intake ports 42 communicating with this trough.

The cap 37 has an upstanding handle portion 37b by which it may be grasped and turned for removal. A metal shaft 43 is fixed in the handle portion, for example by molding or pressing the shaft into the cap material. A circular impeller 44 is rotatably suspended on the shaft and carries pump vanes 45 which are disposed in trough 41. The impeller is preferably made of molded plastic and has a magnet 46 encased in its lower portion. The cap has a discharge opening 47 communicating with trough 41, surrounded by a nipple 48 in which a standpipe 49 is mounted, and also has an auxiliary discharge port 47a. A second magnet 50 is mounted outside bowl 23 and jacket 31 directly under well 35 and is rotatably driven, for example, by an electric motor (not shown) mounted in stand 21. Magnets 50 and 46 are so polarized that the former drives the latter by magnetic coupling to rotate impeller 44. Liquid is thus drawn in through ports 42 and pumped through trough 41 up through standpipe 49 into the upper part of the tank, and out through port 47a, when the pump is running.

A liquid supply tube 51 extends through bowl 23 and jacket 31 for supplying beverage to the tank. A tube 52 for supplying carbon dioxide to the pressure vessel and a pressure relief tube 53 also pass through the bowl and jacket. Both tubes 52 and 53 extend up into dome 22 and have down-turned upper end portions to prevent accidental entrance of liquid into them.

A float 54 is mounted in bowl 23 for control of the liquid level in a manner to be later described. This float is hollow, air-tight, and doughnut shaped, and is made of material such as molded plastic. It slides up and down on a stem 55 fixed in the bowl. A ring-shaped magnet 56 is encased in the float. A mercury switch 57 of well known type, having a pair of contacts mounted on a tiltable vessel 58 containing a globule of mercury, is mounted in the stand 21 immediately below the float. Vessel 58 is mounted on a lever 59 tiltable about pivot 60 and tilted by means of a link 61 connected to a magnet 62. When the liquid level in bowl 23 falls below a certain position, float 54 approaches the bottom of the bowl and its magnet 56 attracts magnet 62, tilting vessel 58 to close the switch contacts.

A dispenser valve 63, which may be of any commercially available type suitable for dispensing carbonated beverages from a tank, is mounted in the forward part of bowl 23 above shelf 21a.

The system for supplying liquid and carbon dioxide to the carbonating tank, formed by bowl 23 and dome 22 and their sealing connection, is shown in FIG. 3. The liquid is supplied from a closed storage tank 64 connected through a solenoid valve 65, to the fluid inlet tube 51 by a pipe line 66. Compressed carbon dioxide is supplied from a suitable source, such as a pressurized cylinder 67, connected through a manual shut-off valve 68, a pressure regulating valve 68a, and a pressure reducing valve 69, to the carbon dioxide intake tube 52 by a pipe line 70. A by-pass line 71 is connected between valve 68a and tank 64. Solenoid valve 65, which is of the type normally closed when deenergized, is connected by suitable wiring in series with a source of electric power 72, which may be A.C. and mercury switch 57. The solenoid is thus energized when float 54 drops low enough to cause the contacts of the mercury switch to close, as has been previously described.

The pressure relief tube 53 is connected to a pressure relief valve 73 of the type designed to open automatically at a predetermined pressure level, and an automatic valve 74, which may be manually operated.

The storage tanks may be placed in any convenient location and the piping connections brought into the device in any suitable manner. The drawing illustrates schematically a typical installation in which the dispensing device is mounted on a counter 75 and the piping connections brought up through stand 21 from storage tanks mounted below the counter. It is understood that the carbonating device is also equipped with suitable circuits for operating the motor which drives the magnetically coupled circulation pump, and the refrigerating unit, in a manner well known in the art.

The operation of the device is as follows:

At the start of operations, when the carbonating tank is empty, float 54 is at its lowest position and switch 57 is closed, so that the energizing circuit to valve 65 is closed and the valve is open. By opening the manual valve 68, which may be the shut-off valve with which a cylinder of compressed carbon dioxide is normally equipped, gas under pressure is allowed to flow through regulator 68a into tank 64, creating a pressure head in that tank and driving liquid up into the carbonating tank through tube 51. The pressure may be regulated by means of valve 68a. Gas simultaneously flows through reducing valve 69 and tube 52 into the upper part of the carbonating tank. During the initial filling operation manual valve 74 is momentarily opened a few times, both to relieve gas pressure in the carbonating tank, thus permitting faster filling, and to "purge" the tank, that is permit the air to escape.

When the liquid level in the carbonating tank reaches a point where the buoyancy of float 54 is sufficient to cause it to rise off the bottom of bowl 23, switch 57 opens, breaking the circuit to the solenoid valve 65, and this valve closes. The float is designed to such proportions that the liquid is shut off when the carbonating tank is only partly filled, leaving a space above, which is filled with carbon dioxide. The circulating pump and refrigerating unit may be started at this time, or earlier, at the start of or during the filling operation.

After the carbonating tank has been filled, as just described, the device will operate automatically until it is again shut down for cleaning or replenishment of the liquid and carbon dioxide supply tanks. A head of carbon dioxide is constantly maintained in tank 20 at a pressure determined by the gas pressure in tank 67, the adjustment of valve 68a, and the reduction created by valve 69. The liquid is continuously circulated by the circulation pump from the lower part of tank 20 up through standpipe 49 into the head of carbon dioxide in dome 22. The liquid is sprayed against the under side of the dome and runs down the sides of the tank all around. Carbonation results from entrapment of gas in the liquid passing through the carbon dioxide head. The liquid in tank 20 is simultaneously chilled by refrigerating coil 29. The discharge of liquid through port 47a sets up a swirling action to maintain continuous motion of the liquid in the lower part of the tank.

The operating pressure desired varies for different types of drinks, for example, ginger ale is preferably carbonated at 24 to 28 pounds per square inch, cola drinks at 20 to 25 pounds, and some fruit drinks at pressures as low as 12 to 16 pounds, but in no case is a pressure higher than 30 pounds required to produce a palatable carbonated drink with this device.

The device may be used either for carbonating a non-carbonated beverage or for maintaining and improving carbonation of a beverage which has been previously carbonated by other means. If the beverage is supplied in carbonated form from tank 64, drinks may be dispensed from tank 20 through the dispensing valve 64 as soon as the beverage has been chilled to the desired temperature. When the beverage is supplied in non-carbonated form, it may be necessary to wait a little longer until the beverage in tank 20 has been carbonated to the desired degree. The continuous carbonating action of the device will thereafter maintain the carbonation at the desired level under normal conditions of demand.

When the liquid level in tank 20 falls below a certain level, causing float 54 to drop to the bottom of bowl 23, switch 57 is again closed and valve 65 is opened to admit more liquid. Reducing valve 69 establishes a differential between the pressure in tank 20 and that in tank 64 which is directly connected to tank 67, to drive liquid up into tank 20. This differential must, of course, be sufficient to raise the liquid the required distance and can be calculated by well known formulas, depending on the height of tank 20 above tank 64. For a typical installation where the carbonating and dispensing device is placed on a drug store counter and the supply tank is set on the floor, a pressure differential of about 5 pounds per square inch is adequate.

When the liquid level in the carbonating tank again rises to a point where the float 54 moves away from the bottom of the tank, switch 57 is opened and valve 65 is closed. There is a differential between the opening and closing levels for the valve because, when more liquid is called for by the closing of switch 57, the level must rise sufficiently to overcome, not only the weight of the float, but the force of the mutual attraction of magnets 56 and 62. When this level is reached, float 54 breaks away from the bottom and immediately rises a certain distance, and magnet 62 simultaneously drops further away from the bottom of the tank. The liquid level must again fall a certain distance before float 54 approaches the bottom closely enough to operate switch 57. This arrangement eliminates "chattering" or constant on-off operation of valve 65 and insures positive operation of the float and switch control on both the opening and closing cycles. Replacement is called for only after a substantial amount of beverage, for example enough for a dozen servings, has been withdrawn from tank 20, and valve 65, once opened, will remain open until an equal quantity of new beverage has been supplied to the tank.

The hemispherical shape of dome 22 and its proximity to the upper end of standpipe 49 serve to deflect and distribute the liquid discharged from the standpipe substantially equally in all directions toward the sides of the tank through the head of carbon dioxide and maintain agitation and circulation of the liquid in the region of the refrigerating coils. FIG. 9 illustrates an alternative deflecting arrangement, which may be used, for example, if the upper portion of the carbonating tank were made higher or of a different shape or if quicker carbonating is desired. In FIG. 9 the standpipe 80, which corresponds in function to standpipe 49, has a shoulder 80a on which a ring 81 is disposed. A shallow frusto-spherical baffle or umbrella 82 is supported above the upper end of standpipe 80 by means of rods 83 attached to ring 81. The umbrella serves to deflect the discharged liquid in all directions toward the sides of the tank, and also provides more surface area of liquid exposed to the gas produces quicker carbonation in any shape tank.

FIG. 10 illustrates a modification of the pump for producing quicker carbonation. The cap 84, which is otherwise similar to cap 37, carries a tube 85 which extends up into the carbon dioxide head above the liquid level in the tank, and the lower end 85a of the tube into port 47a. The discharge of liquid through port 47a creates a pressure drop in the region of the lower end of tube 85, and, as a result, carbon dioxide is drawn from the head and discharged into and circulated with the liquid.

When it is necessary to dismantle the apparatus for cleaning, the manual control valve 68 on the carbon dioxide supply cylinder is closed. The carbonating tank is then drained through valve 63, and the pressure relased by opening valve 74 in the pressure relief tube 53. Due to the friction on the large threaded area between the ring 24 and the dome 22, it is practically impossible to turn either while any pressure remains in the tank. This safety feature prevents opening of the tank under pressure. Once the pressure has been released, ring 24 can be turned easily. To open the tank, ring 24 is manually turned by means of tabe 24a in a direction to raise dome 22. It will be noted thta by turning the ring, a vertical separating force is exerted between gasket 28 and lip 25. When the tank is in use the gasket tends to flow around and stick to the lip, and it might be quite difficult to separate the two initially by turning the dome. The seal can be broken quite readily by turning ring 24, as this involves no circumferential motion between the gasket and the lip. Once the two have been separated, the dome may be easily unscrewed from the lower bowl. The standpipe 49 and float 54 can be lifted out, and the pump removed, leaving the entire interior of the lower bowl accessible for cleaning.

As has been previously mentioned, the new carbonating device is capable of chilling the beverage to the freezing temperature of water or even a little below, because all of the beverage which is being refrigerated is continuously circulated. The beverage, when discharged, is thus at the desired drinking temperature and requires no ice. Furthermore, the beverage will hold its carbonation after it is withdrawn longer than a beverage dispensed at higher temperatures, for example, 35° to 40° F., which is the operating temperature for other types of carbonated beverage dispensers. This device also achieves a high degree of carbonation at low pressure, both becaue the beverage is carbonated at low temperature and because the continuous re-circulation through the carbon dioxide head produces and maintains the maximum entrainment of gas for the particular temperature and pressure conditions. For example, this apparatus operating at a pressure of less than 30 pounds per square inch will produce beverage of a carbon dioxide content of 4 to 5 volumes, as compared to 3.5 volumes which is the content of carbonated beverages made in the usual way.

It has also been found that this apparatus and method of carbonating produces beverages of superior flavor and aroma. Many syurp concentrates, for example those for mixing cola beverages, contain aromatic flavorings which are highly volatile and tend to escape into any empty space in the bottle or container in which the beverage is stored. In this apparatus, any volatile substances which escape into the upper part of the carbonating tank are continually recaptured by entrainment along with the carbon dioxide as the beverage circulates through the pressure head. The beverage thus retains a high content of aromatics when dispensed. Furthermore, the aromatic substances restored to the liquid by circulation through the carbon dioxide head are mixed with the gas, which is released in the form of bubbles as the beverage is consumed, thus enhancing the aroma.

Another advantage of this device and method is that the pump is used merely to circulate the beverage within the carbonating tank, and a small pump of very low power requirements will suffice for this purpose. In comparison, carbonators in which water is drawn from a source at atmospheric pressure outside the tank and sprayed into a high pressure carbon dioxide head in the tank, require expensive and cumbersome pumps with high power consumption.

It is understood that the new device and method of carbonating is here described in detail by way of illustration, and variations may be made without departing from the scope of the invention as defined in the claims appended hereto.

What is claimed is:

1. The method of carbonating and dispensing a beverage which comprises the steps of partially filling a closed tank with a noncarbonated beverage including water and flavor syrup, introducing carbon dioxide gas above the beverage in the tank and maintaining a head of carbon dioxide gas at a pressure in the range below thirty pounds per square inch above the beverage in the tank, continuously recirculating the beverage in the tank through the carbon dioxide head above the beverage before, during and after the beverage is carbonated, maintaining the beverage in the tank refrigerated to a temperature in the range from somewhat below freezing to 35° F., and intermittently withdrawing beverage directly from the tank.

2. The method of carbonating and dispensing a beverage which comprises the steps of partially filling a closed tank with a noncarbonated beverage including water and flavor syrup, introducing carbon dioxide gas into the tank above the level of the beverage and maintaining the two out of contact while being introduced, maintaining a head of carbon dioxide in the tank above the beverage at a pressure in the range below thirty pounds per square inch, circulating the beverage in the bottom of the tank through the carbon dioxide head above the beverage before, during and after the beverage is carbonated, maintaining the beverage in the tank refrigerated to a temperature in a range from somewhat below freezing to a temperature not exceeding 35° F., and withdrawing beverage directly from the tank.

3. A method of carbonating and dispensing a beverage as defined in claim 2 further characterized by said circulation being continuous.

References Cited by the Examiner

UNITED STATES PATENTS

| | | | |
|---|---|---|---|
| 1,070,516 | 8/13 | O'Brien | 220—4 X |
| 1,586,745 | 6/26 | Hulse | 222—146 X |
| 1,628,853 | 5/27 | Lomax | 222—146 |
| 1,900,333 | 3/33 | Curtis | 222—318 |
| 2,104,467 | 1/38 | Marzolf | 222—146 X |
| 2,150,479 | 3/39 | Anderson | 222—318 |
| 2,177,487 | 10/39 | Howlett | 220—4 |
| 2,235,357 | 3/41 | Conklin. | |
| 2,300,300 | 10/42 | Lund. | |
| 2,328,110 | 8/43 | Thompson et al. | 222—129.1 X |
| 2,337,783 | 12/43 | Thompson et al. | |
| 2,440,406 | 4/48 | Kerr | 222—146 X |
| 2,498,524 | 2/50 | Booth | 222—129.1 X |
| 2,611,481 | 9/52 | Sargeant et al. | 220—182 X |
| 2,675,145 | 4/54 | Jacobs | 222—318 X |
| 2,745,641 | 5/56 | Jacobs. | |
| 2,771,208 | 11/56 | Chovanes | 220—4 |
| 2,886,210 | 5/59 | Cooper et al. | 222—1 |
| 2,900,109 | 8/59 | Hoopes et al. | 222—1 |
| 2,940,589 | 6/60 | Silverman | 220—4 X |
| 2,978,143 | 4/61 | Arnett et al. | 222—129.1 X |
| 3,042,265 | 7/62 | Rodth | 222—146 |

RAPHAEL M. LUPO, *Primary Examiner.*